United States Patent
Peng et al.

(10) Patent No.: US 9,018,256 B2
(45) Date of Patent: Apr. 28, 2015

(54) FEED ADDITIVE FOR ANIMALS OF P-THYMOL, SALT DERIVATIVE OR ESTER DERIVATIVE THEREOF

(71) Applicant: Guangzhou Insighter Biotechnology Co., Ltd., Guangzhou, Guangdong (CN)

(72) Inventors: Xianfeng Peng, Guangdong (CN); Zonghua Tan, Guangdong (CN)

(73) Assignee: Guangzhou Insighter Biotechnology Co., Ltd., Guangzhou Science Park Guangzhou Hi-Tech Industrial Development, Guangzhou, Guangdong (CN)

( * ) Notice: Subject to any disclaimer, the term of this patent is extended or adjusted under 35 U.S.C. 154(b) by 0 days.

(21) Appl. No.: 14/016,217

(22) Filed: Sep. 2, 2013

(65) Prior Publication Data
US 2013/0345469 A1 Dec. 26, 2013

Related U.S. Application Data

(63) Continuation-in-part of application No. PCT/CN2011/071533, filed on Mar. 4, 2011.

(30) Foreign Application Priority Data

Mar. 2, 2011 (CN) .............................. 201110048452

(51) Int. Cl.
*A61K 31/22* (2006.01)
*C07C 69/035* (2006.01)
*A23K 1/16* (2006.01)
*A23K 1/18* (2006.01)

(52) U.S. Cl.
CPC .............. *A23K 1/1612* (2013.01); *A23K 1/1609* (2013.01); *A23K 1/1631* (2013.01); *A23K 1/1813* (2013.01); *A23K 1/1826* (2013.01); *A23K 1/184* (2013.01); *A23K 1/1893* (2013.01); *A23K 1/1646* (2013.01)

(58) Field of Classification Search
CPC ........................... A23K 1/1612; C07C 69/157
See application file for complete search history.

(56) References Cited

FOREIGN PATENT DOCUMENTS

| | | |
|---|---|---|
| CN | 101331915 A | 12/2008 |
| JP | 2007269813 A | 10/2007 |
| JP | 2010180213 A | 8/2010 |
| WO | WO 9613175 A1 * | 5/1996 |

OTHER PUBLICATIONS

Mathela et al (Acta Poloniae Pharmaceutica—Drug Research, Synthesis and In Vitro Antibacterial Activity of Thymol and Carvacrol Derivatives, 2010, 67(4), pp. 375-380).*
Zaragoza Dorwald, Side Reactions in Organic Synthesis, 2005, Wiley-VCH Verlag GmbH & Co. KGaA, Weinheim, Preface. p. IX.*
Development of feed additive, Chemical Intermediate, 2006, No. 2, p. 45 Right col. Line 22~p. 46 Left col. Line 2, 31 Dec. 2006.

* cited by examiner

*Primary Examiner* — Paul A Zucker
(74) *Attorney, Agent, or Firm* — Winston Hsu; Scott Margo

(57) ABSTRACT

A feed additive includes at least one of p-thymol, a salt derivative and an ester derivative thereof for animals.

10 Claims, No Drawings

FEED ADDITIVE FOR ANIMALS OF P-THYMOL, SALT DERIVATIVE OR ESTER DERIVATIVE THEREOF

CROSS REFERENCE TO RELATED APPLICATION

This application is a continuation-in-part application of PCT/CN2011/071533, filed on Mar. 4, 2011, which claims the priority of China Patent Application Serial No. 201110048452.3, filed on Mar. 2, 2011. The contents of are all hereby incorporated by reference.

BACKGROUND OF THE INVENTION

1. Field of the Invention

The invention belongs to the field of feeds, and particularly relates to a feed additive of p-thymol, a salt or an ester derivative thereof for use in a complete formula feed.

2. Description of the Prior Art

The usage of feed antibiotics (AGPs) was regarded as the greatest biotechnology in animal husbandry production in the 20th century. It was first reported that streptomycin can stimulate the growth of chicken in 1946, and Food and Drug Administration (FDA) first approved that antibiotics were used as feed additives in 1950. Hereafter, the antibiotics are widely used for treating and preventing bacterial diseases, and are also popularized and applied in a large range as the feed additives, so the antibiotics play an extremely important role in controlling infectious diseases of livestock and poultry and promoting the healthy development of modern breeding industry. However, with more and more use and more and more abuse of the antibiotics, various shortcomings of the antibiotics are gradually recognized by people. The negative effects of the antibiotics serving as the feed additives mainly comprise the following several aspects: firstly, drug-resistant strains are generated, and the occurrence of a large quantity of drug-resistant strains, particularly multiple-resistant strains arouses the worry of people about bacterial drug resistance transfer, so that concern on the problem of public health is aroused; secondly, the growth promoting effect of the antibiotics significantly declines due to the drug-resistant strains, and the antibiotics overdose often occurs clinically, so that the drug resistance of bacteria is more serious, and on the contrary, the toxic and side effects of the antibiotics overdose inhibit the production performance of animals and affect the normal physiological functions of the animals; and finally, long-term use and abuse of the feed antibiotics lead to residue in animal products and the environment and harm the health of human beings. Based on the consideration of multiple aspects, the European Union has comprehensively banned the use of the feed antibiotics as animal growth promoters since 2006, and Korea has also prohibited 8 feed growth promoting antibiotics including enramycin in feeds since August, 2010. Particularly, after the "super bacteria" event in 2010, the doubt about the use of the feed antibiotics and the voice for prohibition has been growing. Therefore, the research and development of effective antibiotic substitutes become an important direction in the development of the feed additive industry.

A lot of work has been done on the research of feed antibiotic substitutes. In the substitutes such as edible essential oil, organic acid, enzyme preparation, oligosaccharides and micro-ecological preparations, the use of essential oil components to substitute the antibiotic growth promoters is the most requested.

Majoram, also named as dysentery stop herb, *elsholtzia patrini* garcke and lobular mint, is a lamiaceae origanum renascent herb. An essential oil extract, namely majoram oil, which is extracted from the natural majoram plant, is light yellow clear oily liquid. At present, the majoram oil has been approved to be used as a feed additive for improving the production performance of livestock and poultry, and is greatly used in European Union countries as a substitute for antibiotic growth promoters.

The majoram oil contains more than 30 components, wherein the main components are carvacrol and thymol which account for 60-70% and 10-20% of the total amount of the majoram oil respectively. Further research has proved that the antibacterial activity of the majoram oil and the effect as the animal growth promoter are mainly from the effects of thymol and carvacrol. Thymol is also named as 'Shexiangcaofen', of which the chemical name is 5-methyl-2-isopropyl-phenol, the melting point is 51.5° C., the boiling point is 232° C., and the oral median lethal dose ($LD_{50}$) of rats is 980 mg/kg weight. Carvacrol is an isomeride of thymol, of which the chemical name is 2-methyl-5-isopropyl-phenol, the melting point is about 0° C., the boiling point is 237-238° C., and the oral median lethal dose ($LD_{50}$) of the rats is 810 mg/kg weight.

Although the production performance of animals can be partially improved when the majoram oil taking thymol and carvacrol as main components is used as a feed additive, the defects of the majoram oil limit the application in the feed industry on three aspects: (1) the strong pungent smell affects feed processing and also reduces the intake of the animals; (2) the majoram oil has strong volatility, so that the majoram oil is easy to volatilize in the feed preservation process and must be used in a large dose; and (3) thymol and carvacrol have relatively strong toxicity on the animals (the oral $LD_{50}$ of the rats are 980 mg/kg weight and 810 mg/kg weight respectively), narrow safety range and weak mutability.

SUMMARY OF THE INVENTION

It is thus an object of the invention to overcome the defects of majoram oil taking thymol and carvacrol as main components in the use as an animal growth feed additive, with p-thymol, a salt or an ester derivative thereof in an animal feed additive provided. P-thymol is an isomeride of thymol, with the chemical name of 3-methyl-4-isopropyl-phenol.

The object of the invention is fulfilled through the following technical scheme: p-thymol, a salt derivative or an ester derivative thereof as an animal feed additive.

P-thymol includes: (1) p-thymol extracted from a plant; and (2) p-thymol synthesized by a chemical method.

The salt derivatives of p-thymol comprise salts formed by p-thymol and metal ions, p-thymol ammonium formed by p-thymol and ammonia, resin salts formed by p-thymol and negative ion resins and the like;

the metal comprises potassium, sodium, calcium, magnesium, copper, iron, manganese, zinc, cobalt, chromium and the like;

the ester derivatives of p-thymol comprise esters formed by p-thymol and different carboxylic acids;

the carboxylic acids comprise formic acid, acetic acid, propionic acid, butyric acid and the like; and the animals comprise various artificially-bred animals such as pigs, chickens, ducks, geese, beef cattle, cows, sheep, rabbits, fishes, shrimps, foxes, ermines and raccoon dogs.

The animal feed of p-thymol and the salt derivatives or the ester derivatives thereof may be used in all growth, production and propagation stages of the animals.

The animal feed of p-thymol and the salt derivatives or the ester derivatives thereof comprises p-thymol and the salt derivatives or the ester derivatives thereof in the name of an antibiotic growth promoter substitute, a growth promoter, a feed flavoring agent, a flavoring agent and the like in an animal feed.

When the animal feed is a complete formula feed, the adding quantity of p-thymol and the salt derivatives or the ester derivatives thereof serving as a growth promoter is 5-500 ppm of the mass of the complete formula feed, preferably 50-250 ppm.

Accordingly, the invention also relates to a formula feed for animals. The formula feed for animals comprises an animal feed and a feed additive. The feed additive comprises at least one of p-thymol, a salt derivative and an ester derivative thereof.

The invention also relates to a method for manufacturing a formula feed for animals. First, an animal feed is provided. Second, the animal feed is mixed/blended with a feed additive to obtain a formula feed for animals.

The invention also relates to a method to feed an animal. First, a formula feed is provided. Second, the formula feed is fed to an animal.

Compared with the prior art, the invention has the advantages and beneficial effects that the animal growth promoting effect on p-thymol and the salt derivatives or the ester derivatives thereof is discovered for the first time, and p-thymol has the characteristics of low volatility, low toxicity, low irritation, strong antibacterial activity and the like compared with thymol and carvacrol, so p-thymol and the salt derivatives or the ester derivatives thereof are more suitable to be used as a growth promoting feed additive for animals to substitute feed antibiotics.

These and other objectives of the present invention will no doubt become obvious to those of ordinary skill in the art after reading the following detailed description of the preferred embodiment that is illustrated in the various figures and drawings.

DETAILED DESCRIPTION

The invention is further illustrated in detail in conjunction with the following embodiments, but the embodiments of the invention are not limited herein.

Embodiment 1 Synthesis of Salt Derivatives or Ester Derivatives of p-Thymol (1) Synthesis of p-thymol sodium: dissolving 75.1 g of p-thymol into 500 ml of tetrahydrofuran solution, adding 20 g (60% wt) of sodium hydride while stirring under the condition of ice bath, reacting for 2 hours, and performing vacuum reduced-pressure distillation on the reaction product to remove the solvent, thus obtaining p-thymol sodium.

(2) Synthesis of p-thymol ammonium: dissolving 75.1 g of p-thymol into 500 ml of tetrahydrofuran solution, continuously introducing ammonia during continuous stirring (200 rpm), stopping the reaction after 6 hours, and performing vacuum reduced-pressure distillation on the reaction product to remove the solvent, thus obtaining p-thymol ammonium.

(3) Synthesis of p-thymol resin salt: dissolving 50 g of p-thymol sodium into 1000 ml of water, adding 200 g of pretreated strongly alkaline polystyrene anion resin, reacting for 6 hours during continuous stirring at room temperature, filtering, washing resin granules by using deionized water, drying to the constant weight, weighing and calculating the drug-loading rate, wherein the content of p-thymol in the resin salt is 21.5%; and crushing, sieving, and taking the component of less than 100 meshes, thus obtaining the p-thymol resin salt.

(4) Synthesis of p-thymol ethyl ester: dissolving 40 g of p-thymol and 40 ml of acetyl chloride into 500 ml of tetrahydrofuran solution, dripping 40 ml of triethylamine during stirring at room temperature, reacting for 4 hours, adding 500 ml of water, stirring uniformly, then adding 1000 ml of ethyl acetate, stirring, extracting, and performing vacuum reduced-pressure distillation on the ethyl acetate phase to remove ethyl acetate, thus obtaining p-thymol ethyl ester.

Embodiment 2 Volatility Comparison Test of p-Thymol, Thymol and Carvacrol

Test Materials p-thymol, thymol and carvacrol: purchased from SIGMA company; vacuum drying oven and circulating water pump: Shanghai Yiheng Test Equipment Factory.

Test Method

1. Volatility Comparison of p-Thymol, Thymol and Carvacrol

Accurately weighing 10.0 g of p-thymol, 10.0 g of thymol and 10.0 g of carvacrol, putting into the vacuum drying oven, performing reduced-pressure drying for 1 hour at the temperatures of 50° C., 70° C. and 90° C. respectively, then weighing the residual weight, and comparing the volatility difference of different compounds.

2. Changes of p-Thymol, Thymol and Carvacrol in the Feed Preservation Process

Preparing chicken complete formula feeds containing 100 ppm (mass) of p-thymol, 100 ppm of thymol and 100 ppm of carvacrol respectively, preserving for a long time at room temperature of 25-30°C., sampling after the feeds are preserved for different time (1, 15, 30, 45 and 60 days), extracting with ethanol respectively to recover p-thymol, thymol and carvacrol in corresponding samples, then measuring the corresponding content of the components by adopting gas chromatography, and comparing the change of each component in the feed preservation process.

Test Results:

1) The test result of 1. is as follows:

Under the condition of reduced-pressure drying, thymol and carvacrol are easy to volatilize; after 1 hour of reduced-pressure drying at different temperatures, the loss of carvacrol is the highest, and carvacrol is completely volatilized within 1 hour at the temperatures of 70° C. and over; under the condition of reduced-pressure drying at the temperature of 70° C., 89.8% of thymol is volatilized within 1 hour; and the volatility of p-thymol is the lowest, and when p-thymol is dried for 1 hour under reduced pressure at the temperatures of 70° C. and 90° C., the volatilized parts only account for 11.4% and 36.6% respectively (see Table 1).

TABLE 1

Loss of P-thymol, Thymol and Carvacrol under the Condition of Reduced-pressure Drying

| Sample | Initial Weight (g) | 50° C. | 70° C. | 90° C. |
|---|---|---|---|---|
| p-thymol | 10.0 | 9.84 | 8.86 | 6.34 |
| thymol | 10.0 | 6.12 | 1.02 | 0 |
| carvacrol | 10.0 | 4.84 | 0 | 0 |

Note:
the numerical values in the table represent the weights (unit: g) remained after reduced-pressure drying 2) The test result of 2. is as follows:

When p-thymol, thymol and carvacrol are added in the complete formula feeds, the stability of p-thymol is the best, the loss of p-thymol is less than 5% after p-thymol is placed for 2 months, and the loss of carvacrol and thymol exceeds 50% (see Table 2).

TABLE 2

Loss of P-thymol, Thymol and Carvacrol under the Condition of Reduced-pressure Drying

| Sample | Initial Concentration (ppm) | 1 day | 15 days | 30 days | 45 days | 60 days |
|---|---|---|---|---|---|---|
| p-thymol | 100 | 99.8 | 99.2 | 98.3 | 97.5 | 96.4 |
| thymol | 100 | 100.4 | 90.2 | 78.9 | 63.7 | 49.7 |
| carvacrol | 100 | 99.6 | 87.7 | 73.1 | 58.5 | 42.6 |

Note:
the numerical values in the table represent the concentration (unit: ppm) measured after the extraction from the complete formula feeds.

Experiment 3 Measurement on safety of p-thymol and the like (rat $LD_{50}$ measurement, and improved Karber's method)

1. Test Materials

Wistar rats are purchased from Animal Experiment Center of Southern Medical University, with the weights of 120 to 150 g, and with the number of males and females respectively accounting for 50%.

Test samples: p-thymol, thymol and carvacrol.

Apparatuses: syringes, intragastric administration needles and rat cages

Test Methods

A, Doses for causing animal 0% (Dn) and 100% (Dm) death are obtained through preliminary experiments, wherein the Dn and the Dm of p-thymol, thymol and carvacrol are shown in Table 3.

TABLE 3

Rat $LD_{50}$ Preliminary Experiment Results (Dn and Dm) of P-thymol, Thymol and Carvacrol

| Compound | Dn (mg/kg weight) | Dm (mg/kg weight) |
|---|---|---|
| p-thymol | 4000 | 8000 |
| thymol | 400 | 1800 |
| carvacrol | 400 | 1800 |

B, As required by the experiments, the maximum reaction rate is 100%, the minimum reaction rate is 0%, or at least the reaction rate approaches to 100% or 0%; and in the dose ratio of the groups, 8 doses are averagely set between Dn and Dm according to the Dn and Dm values of each compound, and 10 rats constitute a group. When the adjacent doses have repeated reaction rates of 100% and 0% in the experiments, the marginal group is abandoned, so that the big dose group only has a reaction rate of 100%, and the small dose group only has a reaction rate of 0%; after grouping, the rats are drenched with different doses of p-thymol, thymol and carvacrol respectively; and the rats are observed for 7 days after administration, and the toxic reaction condition of animals and the distribution of dead animals are recorded day by day during observation.

C. Calculation mode: the $LD_{50}$ and the confidence limit (P=0.95) of p-thymol, thymol and carvacrol on the rats are calculated according to the death rate of each formal experiment group and according to the following formulas:

When the death rate of the minimum dose group is 0% and the death rate of the maximum dose group is 100%, the $LD_{50}$ is calculated according to the following formula:

$$LD_{50} = lg^{-1}[Xm - i(\Sigma p - 0.5)]$$

B. When the death rate of the minimum dose group is more than 0% and less than 30% or the death rate of the maximum dose group is less than 100% and more than 70%, the $LD^{50}$ can be calculated according to the following correction formula:

$$LD_{50} = lg^{-1}\left[Xm - i\left(\sum p - \frac{3 - Pm - Pn}{4}\right)\right]$$

The standard error of the LD50 is as follows:

$$S_{x50} = i\sqrt{\frac{P - P^2}{n - 1}}$$

the average confidence limit of the $LD_{50}$ is as follows:

$$LD_{50} \pm 4.5\, S_{x50}\, LD_{50}\ (P=0.95);$$

and in the above formulas, Xm is the logarithm of the dose of the maximum dose group, i is the difference (subtracting the small dose group from the large dose group) of the logarithmic doses of the two adjacent groups, Pm is the death rate of the maximum dose group, Pn is the death rate of the minimum dose group, P is the death rate of each group, and n is the number of each group of animals.

D. Test Results

The oral lethal doses 50 ($LD_{50}$) of the rats on all the test samples are shown in Table 4, and the results show that the safety of p-thymol is improved by about 30 folds and 25 folds respectively compared with that of thymol and carvacrol.

Compound toxicity judgment standards (compound per-oral acute toxicity grading standards, based on $LD_{50}$) are as follows: <1, extreme toxicity; 1-50, violent toxicity; 51-500, medium toxicity; 501-5000, low toxicity; 5001-50000, relative non-toxicity; >50000, non-toxicity.

TABLE 4

Research Results on Oral LD50 of P-thymol, Thymol and Carvacrol on the Rats

| Test Samples | LD50 (mg/kg weight) | Toxicity Judgment |
|---|---|---|
| p-thymol | 920 | low toxicity |
| thymol | 800 | low toxicity |
| carvacrol | 6400 | relative non-toxicity |

Embodiment 4 In-Vitro antibacterial activity test of p-thymol and the salt or ester derivatives thereof (1) Test Materials:

1. Culture Medium:

LB liquid culture medium: for culturing *escherichia coli* and *salmonella*, with the formula shown as follows:

| | |
|---|---|
| yeast extract | 5 g |
| tryptone | 10 g |
| sodium chloride | 10 g |
| water added to | 1000 ml |
| pH | 7.0-7.2; |

II. TSB liquid culture medium, added with 2 volume percent of bovine serum in use, used for culturing *staphylococcus aureus*, with the formula shown as follows:

| | |
|---|---|
| tryptone | 17 g |
| soy peptone | 3 g |
| yeast extract | 6 g |
| NaCl | 5 g |
| K2HPO4•3H2O | 2.5 g |
| glucose | 2.5 g |
| H2O to | 1 L |
| pH | 7.0-7.4; |

III. Fluid thioglycollate culture medium (FT culture medium): for culturing *clostridium perfringens*, with the formula shown as follows:

| | |
|---|---|
| tryptone | 15 g |
| yeast extract powder | 5 g |
| glucose | 5 g |
| sodium thioglycollate | 0.5 g |
| L-cystine | 0.5 g |
| sodium chloride | 2.5 g |
| resazurin | 0.001 g |
| agar | 0.75 g |
| pH value | 7.1 ± 0.2; |

2. Strains: *escherichia coli* CAU0159, *escherichia coli* CAU0195, *escherichia coli* CAU0020, *escherichia coli* CAU0053, *escherichia coli* CAU0147, *salmonella gallinarum* CAU0206, *salmonella gallinarum* CAU0205, *salmonella gallinarum* QAU0399, *salmonella bacillus* CAU0118, *salmonella choleraesuis* CEC19940146, *salmonella choleraesuis* CEC19940141, *staphylococcus aureus* CAU0871, *staphylococcus aureus* CAU0868, *staphylococcus aureus* CAU0869, *staphylococcus aureus* CAU0866, *staphylococcus aureus* CAU0804, *staphylococcus aureus* CAU0810, *staphylococcus aureus* CAU0837, *clostridium perfringens* CAU0859, *clostridium perfringens* CAU0855, *clostridium perfringens* CAU0795, *clostridium perfringens* CAU0591, *clostridium perfringens* HNAU166 and *clostridium perfringens* HNAU16: purchased from China Veterinary Culture Collection Center.

3. Test Samples:

p-thymol sodium, p-thymol resin salt, p-thymol ammonium and p-thymol ethyl ester: prepared in embodiment 1;

p-thymol, thymol and carvacrol: purchased from SIGMA company.

(2) Test Method (Tube Double Dilution Method)

The test method adopts a tube double dilution method, and the antibacterial activity test of p-thymol on the *staphylococcus aureus* is taken as an example (the methods for testing the antibacterial activities of different compounds on different bacteria are identical). When the test samples are used for testing the antibacterial activities for the *escherichia coli* and the *salmonella*, the culture medium adopts the LB liquid culture medium. When the *clostridium perfringens* is tested, the fresh FT culture medium is adopted, and a layer of paraffin oil for maintaining the anaerobic environment is covered on the surface during culturing. The specific test method comprises the following steps:

picking 12 sterile test tubes numbered 1-12;

B. sterilely adding 9.5 ml of TSB liquid culture medium into the 1st tube, and sterilely adding 5.0 ml of TSB liquid culture medium into the 2nd to 11th tubes;

C. adding 0.5 ml of p-thymol (2% by mass/volume) solution into the 1st tube, then mixing the solution in the 1st tube uniformly, adding 5.0 ml of p-thymol solution from the 1st tube to the 2nd tube sequentially till the 10th tube, and removing 5.0 ml of solution from the 10th tube, wherein the 11th tube is not added with the test sample and is used as a positive control;

D. additionally preparing a tube (12th tube) containing 5.0 ml of TSB liquid culture medium which is not added with the test sample or bacteria, serving as a negative control;

E. adding 50.0 ml of solution of bacteria to be tested (with the concentration of the bacteria of about 108 cfu/ml, and the age of the bacteria of 16-18 h) into the 1st to 11th tubes respectively;

F. performing static culture for 16 h at the temperature of 37° C.; and

G. judging the results, namely observing whether the bacteria are grown or not with naked eyes, wherein turbid growth can be seen in the positive control, and clearness can be seen in the negative control (the positive and negative controls must be accurate). According to the numbers of the test tubes, the drug concentration in the last tube without bacteria growth is the minimum bacteria inhibiting concentration (μg/mL) of p-thymol on the *staphylococcus aureus*.

(3) Test Results

P-thymol and the salt or ester derivatives thereof have broad-spectrum antibacterial activities and have strong inhibiting activities for Gram-positive bacteria (*staphylococcus aureus* and *clostridium perfringens*) and Gram-negative bacteria (*escherichia coli* and *salmonella*), the minimum bacteria inhibiting concentration is 125-250 μg/mL, the antibacterial activity of p-thymol and the salt or ester derivatives thereof is 1-2 times stronger than that of thymol and carvacrol, and the detailed results are shown in Tables 5-8.

TABLE 5

Inhibiting Activity (unit: μg/mL) of P-thymol and the Derivatives Thereof on the *Staphylococcus Aureus*

| Strain and Number | P-thymol | P-thymol sodium | P-thymol resin salt | P-thymol ammonium |
|---|---|---|---|---|
| s. aureus CAU0871 | 125 | 125 | 125 | 125 |
| s. aureus CAU0868 | 125 | 125 | 125 | 125 |
| s. aureus CAU0869 | 125 | 125 | 125 | 125 |
| s. aureus CAU0866 | 125 | 125 | 125 | 125 |
| s. aureus CAU0804 | 250 | 250 | 250 | 250 |
| s. aureus CAU0810 | 125 | 125 | 125 | 125 |
| s. aureus CAU0837 | 125 | 125 | 125 | 125 |

| Strain and Number | P-thymol ethyl ester | Thymol | Carvacrol |
|---|---|---|---|
| s. aureus CAU0871 | 125 | 250 | 250 |
| s. aureus CAU0868 | 125 | 250 | 250 |
| s. aureus CAU0869 | 125 | 125 | 250 |
| s. aureus CAU0866 | 125 | 250 | 250 |
| s. aureus CAU0804 | 250 | 500 | 500 |
| s. aureus CAU0810 | 125 | 125 | 250 |
| s. aureus CAU0837 | 125 | 250 | 250 |

TABLE 6

Inhibiting Activity (unit: μg/mL) of P-thymol and the Derivatives Thereof on the *Clostridium Perfringens*

| Strain and Number | P-thymol | P-thymol sodium | P-thymol resin salt | P-thymol ammonium |
|---|---|---|---|---|
| *clostridium perfringens* CAU0859 | 125 | 125 | 125 | 125 |
| *clostridium perfringens* CAU0855 | 125 | 125 | 125 | 125 |

TABLE 6-continued

Inhibiting Activity (unit: μg/mL) of P-thymol and the
Derivatives Thereof on the *Clostridium Perfringens*

| | | | | |
|---|---|---|---|---|
| *clostridium perfringens* CAU0795 | 125 | 125 | 125 | 125 |
| *clostridium perfringens* CAU0591 | 250 | 250 | 250 | 250 |
| *clostridium perfringens* HNAU166 | 125 | 125 | 125 | 125 |
| *clostridium perfringens* HNAU160 | 250 | 250 | 250 | 250 |

| Strain and Number | P-thymol ethyl ester | Thymol | Carvacrol |
|---|---|---|---|
| *clostridium perfringens* CAU0859 | 125 | 250 | 500 |
| *clostridium perfringens* CAU0855 | 125 | 250 | 500 |
| *clostridium perfringens* CAU0795 | 125 | 250 | 250 |
| *clostridium perfringens* CAU0591 | 250 | 250 | 500 |
| *clostridium perfringens* HNAU166 | 125 | 250 | 250 |
| *clostridium perfringens* HNAU160 | 250 | 500 | 500 |

TABLE 7

Inhibiting Activity (unit: μg/mL) of P-thymol and the
Derivatives Thereof on the *Escherichia Coli*

| strain and number | p-thymol | p-thymol sodium | p-thymol resin salt | p-thymol ammonium |
|---|---|---|---|---|
| *escherichia coli* CAU0159 | 125 | 125 | 125 | 125 |
| *escherichia coli* CAU0195 | 250 | 250 | 250 | 250 |
| *escherichia coli* CAU0020 | 125 | 125 | 125 | 125 |
| *escherichia coli* CAU0053 | 250 | 250 | 250 | 250 |
| *escherichia coli* CAU0147 | 125 | 125 | 125 | 125 |

| strain and number | p-thymol ethyl ester | thymol | carvacrol |
|---|---|---|---|
| *escherichia coli* CAU0159 | 125 | 250 | 250 |
| *escherichia coli* CAU0195 | 250 | 250 | 500 |
| *escherichia coli* CAU0020 | 125 | 250 | 250 |
| *escherichia coli* CAU0053 | 250 | 250 | 500 |
| *escherichia coli* CAU0147 | 125 | 250 | 250 |

TABLE 8

Inhibiting Activity (unit: μg/mL) of P-thymol and the
Derivatives Thereof on the *Salmonella*

| Strain and Number | P-thymol | P-thymol sodium | P-thymol resin salt | P-thymol ammonium |
|---|---|---|---|---|
| *salmonella gallinarum* CAU0206 | 125 | 125 | 125 | 125 |
| *salmonella gallinarum* CAU0205 | 125 | 125 | 125 | 125 |
| *salmonella gallinarum* QAU0399 | 125 | 125 | 125 | 125 |
| *salmonella bacillus* CAU0118 | 125 | 125 | 125 | 125 |
| *salmonella choleraesuis* CEC19940146 | 250 | 250 | 250 | 250 |
| *salmonella choleraesuis* CEC19940141 | 125 | 125 | 125 | 125 |

TABLE 8-continued

Inhibiting Activity (unit: μg/mL) of P-thymol and the
Derivatives Thereof on the *Salmonella*

| Strain and Number | P-thymol ethyl ester | Thymol | Carvacrol |
|---|---|---|---|
| *salmonella gallinarum* CAU0206 | 125 | 250 | 500 |
| *salmonella gallinarum* CAU0205 | 125 | 500 | 250 |
| *salmonella gallinarum* QAU0399 | 125 | 500 | 500 |
| *salmonella bacillus* CAU0118 | 125 | 250 | 250 |
| *salmonella choleraesuis* CEC19940146 | 250 | 250 | 250 |
| *salmonella choleraesuis* CEC19940141 | 125 | 250 | 500 |

Embodiment 5 Growth promoting effect test of p-thymol on chickens

Test Materials 1-day-old Lingnan yellow big chicken, provided by the Breeding Chicken Farm of Institute of Animal Science, Guangdong Academy of Agricultural Sciences 102-type chicken feed: containing no antibiotics, provided by the Institute of Animal Science, Guangdong Academy of Agricultural Sciences p-thymol, thymol and carvacrol: purchased from SIGMA company.

(2) Test Method

1. Growth Promoting Effect Test of Different Doses of p-Thymol on Chickens 400 1-day-old chickens are randomly divided into 8 groups, and each group comprises 50 chickens. Different drugs (Table 9) are added to the feed of each group, and the survival rate, the weight gain and the feed reward of each group of 1 to 21-day-old test chickens are counted. The test process is cage culture above a net.

TABLE 9

Growth Promoting Effect Test Groups of Different Doses of
P-thymol on the Chickens

| Group | Quantity of Animals | Drug | Dose (ppm) |
|---|---|---|---|
| control group without adding antibiotics | 50 | — | 0 |
| test group 1 | 50 | p-thymol | 5 |
| test group 2 | 50 | p-thymol | 10 |
| test group 3 | 50 | p-thymol | 20 |
| test group 4 | 50 | p-thymol | 50 |
| test group 5 | 50 | p-thymol | 100 |
| test group 6 | 50 | p-thymol | 200 |
| test group 7 | 50 | p-thymol | 500 |

Comparison of Chicken Growth Promoting Effects of p-Thymol, Thymol and Carvacrol 200 1-day-old chickens are randomly divided into 4 groups, and each group comprises 50 chickens. Different drugs (Table 10) are added to the feed of each group, and the survival rate, the weight gain and the feed reward of each group of 1 to 21-day-old chickens are counted. The test process is cage culture above the net.

TABLE 10

Growth Promoting Test Groups of P-thymol, Thymol and Carvacrol on Chickens

| Group | Quantity of Animals | Drug | Dose (ppm) |
|---|---|---|---|
| control group without drug | 50 | — | — |
| test group 1 | 50 | p-thymol | 100 |
| test group 2 | 50 | thymol | 100 |
| test group 3 | 50 | carvacrol | 100 |

Test Results

Growth Promoting Test Results of Different Doses of p-Thymol on Chickens

Through the feeding test result analysis of the 1 to 21-day-old test chickens, different doses of p-thymol have the growth promoting effect to different degrees. Compared with the control group without adding the drug, the survival rate of each test group is 100%, but the weight gain of the test group added with p-thymol is improved by 1.32-7.39% compared with the control group and has certain correlation with the adding dose. Moreover, the test group added with p-thymol can improve the feed reward to different degrees, and compared with the control group without adding the drug, the feed conversion rate is reduced by 0.003 to 0.108 (Table 11).

TABLE 11

Chicken Growth Promoting Test Results of Different Doses of P-thymol

| Group | Dose (ppm) | Survival Rate (%) | Average Weight Gain (g) | Relative Weight Gain Rate (%) | Total Weight Gain (kg) | Total Feed Consumption (kg) | Feed Conversion Rate |
|---|---|---|---|---|---|---|---|
| control group without adding the drug | 0 | 100 | 326.1 | 100 | 16.31 | 29.02 | 1.779 |
| test group 1 | 5 | 100 | 330.4 | 101.32 | 16.52 | 29.33 | 1.776 |
| test group 2 | 10 | 100 | 338.3 | 103.74 | 16.92 | 29.34 | 1.734 |
| test group 3 | 20 | 100 | 341.3 | 104.66 | 17.07 | 29.33 | 1.718 |
| test group 4 | 50 | 100 | 343.5 | 105.33 | 17.18 | 29.29 | 1.705 |
| test group 5 | 100 | 100 | 348.3 | 106.81 | 17.42 | 29.28 | 1.681 |
| test group 6 | 200 | 100 | 347.8 | 106.65 | 17.39 | 29.32 | 1.686 |
| test group 7 | 500 | 100 | 350.2 | 107.39 | 17.51 | 29.26 | 1.671 |

2. Comparison Test Results of Chicken Growth Promoting Effects of p-Thymol, Thymol and Carvacrol Through the feeding test result analysis of the 1 to 21-day-old test chickens, after 100 ppm of p-thymol, thymol or carvacrol is added into the feed, compared with the control group without adding the drug, p-thymol has an obvious growth promoting effect, the relative weight gain rate is improved by 6.82%, and the feed conversion rate is reduced by 0.066. The growth promoting effects of the thymol and carvacrol test groups are inferior to the growth promoting effect of the p-thymol test group, the relative weight gain rates are only improved by 3.78% and 3.19% respectively, and the feed conversion rates are reduced by 0.026 and 0.021 respectively (compared with the control group without adding the drug, as shown in Table 12).

TABLE 12

Comparison Test Results of Chicken Growth Promoting Effects of P-thymol, Thymol and Carvacrol

| Group | Dose (ppm) | Survival Rate (%) | Average Weight Gain (g) | Relative Weight Gain Rate (%) | Total Weight Gain (kg) | Total Feed Consumption (kg) | Feed Conversion Rate |
|---|---|---|---|---|---|---|---|
| control group without adding the drug | 0 | 100 | 322.6 | 100 | 16.13 | 28.74 | 1.782 |
| p-thymol | 100 | 100 | 344.6 | 106.82 | 17.23 | 29.57 | 1.716 |
| thymol | 100 | 100 | 334.8 | 103.79 | 16.74 | 29.40 | 1.756 |
| carvacrol | 100 | 100 | 332.9 | 103.19 | 16.65 | 29.32 | 1.761 |

Embodiment 6 Growth promoting effect test of p-thymol on pigs (1) Test Materials 120 three-way cross weaned pigs, provided by Guangdong Minfeng Breeding Pig Farm 303-type pig complete formula feed, containing no antibiotics, provided by the Feed Factory of Guangdong Minfeng Livestock Development Co., Ltd.

p-thymol, thymol and carvacrol: purchased from SIGMA company.

(2) Test Method 120 weaned pigs are grouped as in Table 13, and each group comprises 30 pigs. After different growth promoters are added to the feed of each group, the pigs freely eat the feed, the weight gain and the feed reward of each group of test pigs after the pigs are weaned for 30 days are counted, and the difference of the growth promoting effects of p-thymol, thymol and carvacrol on the pigs is compared.

TABLE 13

Pig Growth Promoting Test Groups of P-thymol, Thymol and Carvacrol

| Group | Quantity of Animals | Average Initial Weight (kg) | Growth Promoter | Concentration (ppm) |
|---|---|---|---|---|
| 1 | 30 | 8.15 | — | — |
| 2 | 30 | 8.20 | p-thymol | 100 |
| 3 | 30 | 8.08 | thymol | 100 |
| 4 | 30 | 8.22 | carvacrol | 100 |

(3) Test Results

Through the feeding test result analysis of the weaned pigs, after p-thymol, thymol and carvacrol are added into the complete formula feed respectively, compared with the control group without adding the drug, p-thymol, thymol and carvacrol have the growth promoting effects to different degrees, the relative weight gain rates are improved by 7.17%, 4.96% and 4.69% respectively, the feed conversion rates are reduced by 0.133, 0.097 and 0.085 respectively, and the growth promoting effect and the feed reward improvement of p-thymol are superior to those of the thymol and carvacrol test groups (Table 14).

TABLE 14

Growth Promoting Test Results of P-thymol, Thymol and Carvacrol on Pigs

| Group | Quantity of Animals | Survival Rate (%) | Average Weight Gain (g) | Relative Weight Gain Rate (%) | Total Weight Gain (kg) | Total Feed Consumption (kg) | Feed Conversion Rate |
|---|---|---|---|---|---|---|---|
| control group | 30 | 100 | 10.88 | 100 | 326.4 | 790.2 | 2.421 |
| p-thymol group | 30 | 50 | 11.66 | 107.17 | 349.8 | 800.2 | 2.288 |
| thymol group | 30 | 100 | 11.42 | 104.96 | 342.6 | 796.3 | 2.324 |
| carvacrol group | 30 | 100 | 11.39 | 104.69 | 341.7 | 798.1 | 2.336 |

Embodiment 7 Growth promoting effect test of p-thymol on ducks

Test Materials 1-day-old Chemy Valley ducks, provided by Guangzhou Nongfeng Breeding Duck Farm 807-type complete formula duck feed: containing no antibiotic growth promoters, provided by Guangzhou Huinong Feed Factory p-thymol, thymol and carvacrol, purchased from SIGMA company.

(2) Test Method 400 1-day-old Chemy Valley ducks are randomly divided into 4 groups, and each group comprises 100 ducks. Different growth promoters (Table 15) are added to the feed of each group, and the survival rate, the weight gain and the feed reward of each group of 1 to 46-day-old ducks are counted. The test process is cage culture above a net.

TABLE 15

Growth Promoting Test Groups of P-thymol, Thymol and Carvacrol on Ducks

| Group | Quantity of Animals | Drug | Dose (ppm) |
|---|---|---|---|
| control group without adding the drug | 100 | — | — |
| p-thymol group | 100 | p-thymol | 100 |
| thymol group | 100 | thymol | 100 |
| carvacrol group | 100 | carvacrol | 100 |

(3) Test Results

As shown by the breeding experimental results, after p-thymol, thymol and carvacrol are added into the complete formula feed respectively, compared with the control group without adding the drug, p-thymol, thymol and carvacrol have obvious growth promoting effects, the relative weight gain rates are improved by 6.65%, 4.38% and 2.51% respectively, the feed conversion rates are reduced by 0.112, 0.062 and 0.049 respectively, and the growth promoting effect and the feed reward improvement of p-thymol are superior to those of the thymol and carvacrol test groups (Table 16).

TABLE 16

Comparison Test Results of Duck Growth Promoting Effects of P-thymol, Thymol and Carvacrol

| Group | Dose (ppm) | Survival Rate (%) | Average Weight Gain (g) | Relative Weight Gain Rate (%) | Total Weight Gain (kg) | Total Feed Consumption (kg) | Feed Conversion Rate |
|---|---|---|---|---|---|---|---|
| control group without adding the drug | 0 | 100 | 3.306 | 100 | 330.6 | 921.7 | 2.788 |
| p-thymol group | 100 | 100 | 3.526 | 106.65 | 352.6 | 943.6 | 2.676 |
| thymol group | 100 | 100 | 3.451 | 104.38 | 345.1 | 940.7 | 2.726 |
| carvacrol group | 100 | 100 | 3.389 | 102.51 | 338.9 | 928.3 | 2.739 |

Embodiment 8 Application of p-thymol in aquatic feed (1) Test Materials

Test fishes: the test fishes are black carps from annual fingerlings and are provided by Dafeng Breeding Farm in Huizhou of Guangdong. The healthy and lively black carps with the consistent size are bred for 4 weeks in a big net cage (4×2×1.5 m3) and then are used for formal breeding test, the experimental system comprises floating small net cages (1.1× 1.1×1.1 m3), an inflating head is arranged in each small net cage, and the small net cages are inflated all the day. The small net cages and temporary net cages are placed in a pond of 3500 m2 in a test field, the water depth of the pond is about 1.5 m, and the water in the pond is fully-aerated bottom water. During the test, 192 black carps which are hungry for 1 day are randomly divided into 4 groups, each group is repeated for 4 times, 12 black carps are put into each repeated group, and the whole groups are weighed, then randomly put into 12 net cages and fed with different test feeds respectively.

Test feed: the test feed is prepared according to the formula of Table 17, and different test groups are added with different growth promoters according to Table 18 respectively. The raw materials for the feed are super-finely crushed and then prepared into a floating puffed feed with the grain diameter of 3 mm through a Jiangsu shepherd puffing unit, the mold stripping temperature is 130° C., the floating puffed feed is sprayed with 3% of soybean oil through oil spraying equipment, and the feed is sealed and preserved in the shade for later use.

TABLE 17

Formula and Chemical Components (% wt.) of Test Black Carp Feed

| Raw Materials | Content (%) | Raw Materials | Content (%) |
|---|---|---|---|
| fish meal | 9.0 | soybean oil | 3.0 |
| casing powder | 3.0 | phospholipid | 9.0 |
|  |  | rapeseed meal |  |
| bean pulp | 12.0 | wheat gluten | 4.0 |
| rapeseed meal | 12.0 | blood cell meal | 2.0 |
| monosodium glutamate protein | 3.0 | Vc-phosphate | 0.1 |
| wheat middling | 12.6 | calcium dihydrogen phosphate | 1.8 |
| flour | 17.0 | choline chloride | 0.2 |
| bentonite | 0.70 | multivitamins | 0.1 |

TABLE 17-continued

Formula and Chemical Components (% wt.) of Test Black Carp Feed

| Raw Materials | Content (%) | Raw Materials | Content (%) |
|---|---|---|---|
| rice bran | 10.0 | micro-mineral premix | 0.5 |

TABLE 18

Growth Promoting Test Groups of P-thymol, Thymol and Carvacrol on Fishes

| Group | Drug | Dose (ppm) |
|---|---|---|
| control group without drug | — | — |
| p-thymol group | p-thymol | 100 |
| thymol group | thymol | 100 |
| carvacrol group | carvacrol | 100 |

Test Method

Test management: the test adopts artificial limited feeding, the feeding quantity is adjusted once a week, the feeding levels (according to the initial weights) of two groups are completely consistent, and the fishes are fed twice (7:30 and 15:00) every day. The test period is 8 weeks. The water quality is periodically monitored during the test. In the whole breeding process, the temperature of water is 26.88±3.08° C., the dissolved oxygen (DO) is more than 5.0 mg OL-1, the pH is 7.8, the ammonia nitrogen is less than 0.50 mg N L-1, and the nitrite nitrogen is less than 0.05 mg N L-1.

Parametric statistics: during the test, each whole net cage is weighed after feeding is stopped for 1 day, and the weight gain (WG, %), the feed conversion rate (FCR) and the survival rate (SR, %) are calculated. The calculation formulas are as follows:

weight gain(WG,%)=100×(average final weight−average initial weight)/average initial weight;

feed conversion rate(FCR)=feed intake/fish weight gain;

survival rate(SR,%)=100×fish quantity when the test is completed/fish quantity when the test starts.

Test Results

The growth promoting test results of p-thymol, thymol and carvacrol on the fishes are shown in Table 19. The results show that the test groups added with p-thymol, thymol and carvacrol are superior to the control group without the drug on the aspects of weight gain, feed conversion rate and survival rate, and p-thymol, thymol and carvacrol have obvious growth promoting effects, wherein the average weight gains are improved by 7.47%, 4.53% and 3.52% respectively, and the feed conversion rates are reduced by 5.37%, 3.36% and 2.68%. The results show that the p-thymol test group is superior to the thymol and carvacrol test groups on the aspects of growth promotion and feed reward improvement.

TABLE 19

Application Test Results of P-thymol in Aquatic Feed

| Parameter | Control group | P-thymol group | Thymol group | Carvacrol group |
|---|---|---|---|---|
| initial weight (g) | 251.20 ± 2.43 | 251.60 ± 2.73 | 251.40 ± 2.35 | 251.30 ± 2.18 |
| final weight (g) | 586.20 ± 25.40 | 611.61 ± 26.03 | 601.58 ± 28.02 | 598.08 ± 27.11 |
| weight gain (%) | 133.36 ± 7.97 | 143.09 ± 8.22 | 139.29 ± 7.37 | 138.0 ± 7.78 |
| feed conversion rate (FCR) | 1.49 ± 0.11 | 1.41 ± 0.09 | 1.44 ± 0.08 | 1.45 ± 0.06 |
| survival rate (SR) (%) | 100 | 100 | 100 | 100 |

Embodiment 9 Growth promoting effect research of p-thymol and salt or ester derivatives thereof on animals and pigs Test Materials Test animals: 140 50-day-old healthy three-way cross pigs, provided by Guangdong Minfeng Breeding Pig Farm 304-type complete formula pig feed: containing no antibiotics, provided by the Feed Factory of Guangdong Minfeng Livestock Development Co., Ltd.

p-thymol sodium, p-thymol resin salt, p-thymol ammonium and p-thymol ethyl ester are prepared in embodiment 1, and p-thymol, thymol and carvacrol are purchased from SIGMA company.

(2) Test Method 140 50-day-old pigs are grouped as in Table 20, and each group comprises 20 pigs. After different test samples are added into the feed, each group freely eats the feed. The weight gain of test pigs of each test group and the feed reward on the 30th day after the test starts are counted, and the influence of different p-thymol derivatives on the production performance of the test pigs is compared.

TABLE 20

Test Groups of the Influence of P-thymol Derivatives on the Production Performance of the Test Pigs

| Group | Quantity of Animals | Average Initial Weight (kg) | Growth Promoter | Dose (ppm) |
|---|---|---|---|---|
| 1 | 20 | 15.60 | — | — |
| 2 | 20 | 15.65 | thymol | 100 |
| 3 | 20 | 15.42 | p-thymol | 100 |
| 4 | 20 | 15.50 | p-thymol resin salt | 100 |
| 5 | 20 | 15.48 | p-thymol sodium | 100 |
| 6 | 20 | 15.52 | p-thymol ammonium | 100 |
| 7 | 20 | 15.55 | p-thymol ethyl ester | 100 |

(3) Test Results

As shown by animal feeding test results, p-thymol and the salt or ester derivatives thereof have remarkable improvement on the growth performance of the test pigs; the average weight gains of the p-thymol sodium, p-thymol resin salt, p-thymol ammonium and p-thymol ethyl ester test groups are improved by 9.4%, 9.1%, 8.9% and 10.7% respectively compared with the control group without adding the growth promoter; and the feed conversation rates are reduced by 0.199, 0.199, 0.197 and 0.190 respectively. The growth promoting effects of p-thymol and the salt or ester derivatives thereof are equivalent to the effects of the same dose of p-thymol test groups but superior to the effect of the thymol test group (Table 21).

TABLE 21

Test Results of the Test Influence of P-thymol and Salt or Ester Derivatives Thereof on the Production Performance of the Pigs

| Group | Survival Rate (%) | Average Weight Gain (g) | Relative Weight Gain Rate (%) | Total Weight Gain (kg) | Total Feed Consumption (kg) | Feed Conversion Rate |
|---|---|---|---|---|---|---|
| control group without drug | 100 | 15.66 | 100 | 313.2 | 694.7 | 2.218 |
| thymol group | 100 | 16.22 | 103.6 | 324.4 | 680.6 | 2.098 |
| p-thymol group | 100 | 17.10 | 109.2 | 342.0 | 693.9 | 2.029 |
| p-thymol sodium group | 100 | 17.13 | 109.4 | 342.6 | 693.8 | 2.025 |
| p-thymol resin salt group | 100 | 17.08 | 109.1 | 341.6 | 691.7 | 2.025 |
| p-thymol ammonium group | 100 | 17.05 | 108.9 | 341.0 | 691.6 | 2.028 |
| p-thymol ethyl ester group | 100 | 17.34 | 110.7 | 346.8 | 701.2 | 2.022 |

The embodiments are better embodiments of the invention, but the implementation modes of the invention are not limited by the embodiments, and other any changes, modifications, replacements, combinations and simplifications which do not depart from the spirit and principle of the invention are equivalent replacement modes and shall be encompassed in the protection scope of the invention.

The invention discloses p-thymol and salt or ester derivatives thereof in an animal feed additive. P-thymol is an isomeride of thymol with the chemical name of 3-methyl-4-isopropyl phenol. The salt derivatives of p-thymol comprise salts formed by p-thymol and metal ions, p-thymol ammonium formed by p-thymol and ammonia, resin salts formed by p-thymol and negative ion resins and the like; and the ester derivatives of p-thymol comprise esters formed by p-thymol and different carboxylic acids. The applicants firstly discover that p-thymol and the salt derivatives or the ester derivatives thereof have stronger antibacterial activity, lower volatility, higher safety and lower thrill compared with thymol and carvacrol. When being taken as the additive of the animal growth promoting feed, p-thymol and the salt derivatives or the ester derivatives thereof have better palatability and growth promoting effect compared with thymol or carvacrol.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A feed additive for animals, comprising:
   at least one of p-thymol, a salt derivative of said p-thymol and an ester derivative of formic acid, acetic acid, propionic acid, butyric acid of said p-thymol.

2. The feed additive for animals of claim 1, wherein said p-thymol is extracted and purified from a plant or synthesized by a chemical method.

3. The feed additive for animals of claim 1, wherein said salt derivative is at least one of salts formed by p-thymol and metal ions, p-thymol ammonium formed by p-thymol and ammonia, and resin salts formed by p-thymol and negative ion resins.

4. The feed additive for animals of claim 3, wherein said metal is one of potassium, sodium, calcium, magnesium, copper, iron, manganese, zinc, cobalt and chromium.

5. The feed additive for animals of claim 1, wherein said ester derivative is an ester formed by said p-thymol and different carboxylic acids.

6. The feed additive for animals of claim 5, wherein said carboxylic acid is one of formic acid, acetic acid, propionic acid and butyric acid.

7. The feed additive for animals of claim 1, wherein said animals are various bred animals.

8. The feed additive for animals of claim 7, wherein said bred animals are pigs, chickens, ducks, geese, beef cattle, cows, sheep, fishes, shrimps, foxes, ermines or raccoon dogs; and the bred animals are those of all growth stages.

9. The feed additive for animals of claim 1, wherein the quantity of one of said p-thymol, said salt derivative and said ester derivative thereof serving as an animal feed growth promoter is 5-500 ppm of the mass of a complete formula feed.

10. The feed additive for animals of claim 9, wherein said quantity of one of said p-thymol, said salt derivative and said ester derivative thereof serving as said animal feed growth promoter is 50-250 ppm of said mass of said complete formula feed.

\* \* \* \* \*

UNITED STATES PATENT AND TRADEMARK OFFICE
CERTIFICATE OF CORRECTION

PATENT NO. : 9,018,256 B2  
APPLICATION NO. : 14/016217  
DATED : April 28, 2015  
INVENTOR(S) : Xianfeng Peng et al.

Page 1 of 1

It is certified that error appears in the above-identified patent and that said Letters Patent is hereby corrected as shown below:

On the title page, item (72), correct the name of the second inventor from "Zonghua Tan" to --Zonghua Qin--.

Signed and Sealed this
Twelfth Day of July, 2016

Michelle K. Lee
*Director of the United States Patent and Trademark Office*